US011017232B2

(12) United States Patent
Alexander

(10) Patent No.: US 11,017,232 B2
(45) Date of Patent: May 25, 2021

(54) SYSTEM FOR PROVIDING LIVE VIRTUAL-REALITY AND AUGMENTED REALITY ENVIRONMENTS

(71) Applicant: DOUBLE EAGLE LLC, Falls Church, VA (US)

(72) Inventor: John Alexander, Falls Church, VA (US)

(73) Assignee: DOUBLE EAGLE, LLC, Great Falls, VA (US)

(*) Notice: Subject to any disclaimer, the term of this patent is extended or adjusted under 35 U.S.C. 154(b) by 0 days.

(21) Appl. No.: 16/705,364

(22) Filed: Dec. 6, 2019

(65) Prior Publication Data
US 2020/0184221 A1 Jun. 11, 2020

Related U.S. Application Data

(60) Provisional application No. 62/776,283, filed on Dec. 6, 2018.

(51) Int. Cl.
| | | |
|---|---|---|
| *G06K 9/00* | (2006.01) | |
| *G06K 9/62* | (2006.01) | |
| *G06T 15/20* | (2011.01) | |
| *H04N 7/18* | (2006.01) | |

(52) U.S. Cl.
CPC ....... *G06K 9/00671* (2013.01); *G06K 9/0063* (2013.01); *G06K 9/6256* (2013.01); *G06T 15/205* (2013.01); *H04N 7/185* (2013.01); *G06K 2009/00644* (2013.01)

(58) Field of Classification Search
None
See application file for complete search history.

(56) References Cited

U.S. PATENT DOCUMENTS

| | | | | |
|---|---|---|---|---|
| 2012/0092503 | A1* | 4/2012 | Cheng | H04N 5/232 |
| | | | | 348/159 |
| 2013/0113831 | A1* | 5/2013 | Giuffrida | H04N 7/18 |
| | | | | 345/634 |
| 2015/0288950 | A1* | 10/2015 | Zhang | H04N 9/09 |
| | | | | 348/47 |
| 2017/0300757 | A1* | 10/2017 | Wolf | G06K 9/3233 |
| 2018/0046357 | A1* | 2/2018 | Holzer | G06K 9/72 |

* cited by examiner

*Primary Examiner* — Vu Nguyen
(74) *Attorney, Agent, or Firm* — Burr & Forman, LLP

(57) ABSTRACT

A system for generating a low latency, ultra-high resolution representation of a surveillance subject at a remote location relative to a viewing site at which the representation is presented includes a surveillance module configured to obtain image data of the surveillance subject, a mobile HPC module in communication with the surveillance module via a first communication link to receive the image data and process the image data, a long range link in communication with the mobile HPC module via a second communication link to communicate the processed image data to the viewing site via a third communication link, and an integration module disposed at the viewing site. The integration module is configured to receive the processed image data via the third communication link, and display a virtual environment based on the processed image data.

20 Claims, 6 Drawing Sheets

SYSTEM FOR PROVIDING LIVE VIRTUAL-REALITY AND AUGMENTED REALITY ENVIRONMENTS

TECHNICAL FIELD

Example embodiments generally relate to virtual-reality, mixed-reality and augmented-reality services and, more particularly, relate to a system for providing live or near-live (i.e., low latency) virtual-reality, mixed-reality and augmented-reality environments under permissive, semi-permissive, and non-permissive conditions.

BACKGROUND

The demand for high-speed data communications in modern society has driven the continued development of highly capable devices and communication systems. These devices and systems have made it possible for users to maintain nearly continuous connectivity to the Internet and other communication networks. Moreover, individual components and subsystems continue to evolve to improve the services that are provided or are capable of being provided via these devices and systems. Although some of these high-speed data connections are available through telephone lines, cable modems or other such devices that have a physical wired connection, wireless connections have revolutionized our ability to stay connected without sacrificing mobility.

The ability to stay connected while being mobile has come to be expected by individuals and organizations under normal circumstances (i.e., in permissive environments). However, when natural disasters occur, or when operations are required in potentially hostile or remote locations (i.e., when operating in semi-permissive and non-permissive environments), the challenge of providing the same levels of connectivity become significant. Thus, for military, security and emergency management commanders and planners, a system capable of providing live (low latency) virtual-reality (LVR), mixed-reality (MR) and augmented-reality (AR) services while also being readily deployable into permissive, semi-permissive and non-permissive environments may truly enable global reach without service degradation.

Accordingly, it may be desirable to provide a system and or devices that are capable of performing LVR, MR and AR services as described herein.

BRIEF SUMMARY OF SOME EXAMPLES

In an example embodiment, a system for generating a low-latency, high resolution 3D representation of a surveillance subject at a remote location relative to a viewing site where the representation is presented may be provided. The system includes a surveillance module configured to obtain image data of the surveillance subject, a mobile high-performance computing (HPC) module in communication with the surveillance module via a first communications link to receive the image data and process the image data, a long-range link in communication with the mobile HPC module via a second communications link to communicate the processed image data to the viewing site via a third communications link, and an integration module disposed at the viewing site. The integration module is configured to receive the processed image data via the third communications link, and display a virtual environment based on the processed image data. The surveillance module includes multi-spectral imaging sensors configured to obtain high and low-resolution, multi-spectral video and still-imagery.

In one example embodiment, a mobile HPC module operably coupled to one or more ground or air assets generating a low-latency, multi-spectral, multi-modal data stream for representation of a surveillance subject at a remote location relative to a viewing site at which the representation presented may be provided. The mobile HPC module may include a network hub configured to interface with one or more ground, maritime or air assets via a first communications link and provide the data stream to a long-range link via a second communications link and processing circuitry. The processing circuitry may be configured to receive a compressed live stream of multi-spectral video and still imagery data from the one or more ground, maritime or air assets, and decompress the image data and select, decimate, and photogrammetrically process images in the decompressed image data to generate the data stream as a 3D visual mosaic for transmission to the viewing site via the long-range link.

In another example embodiment, an integration module is provided. The integration module may be operably coupled to one or more ground, maritime or air assets via a mobile HPC module and a long-range link to generate a low-latency, multi-spectral, multi-modal data stream for representation of a surveillance subject at a remote location relative to a viewing site at which the representation is presented by the integration module. The integration module includes processing circuitry configured to display a 3D visual mosaic as the representation in a virtual environment in a fully immersive viewing facility at the viewing site.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
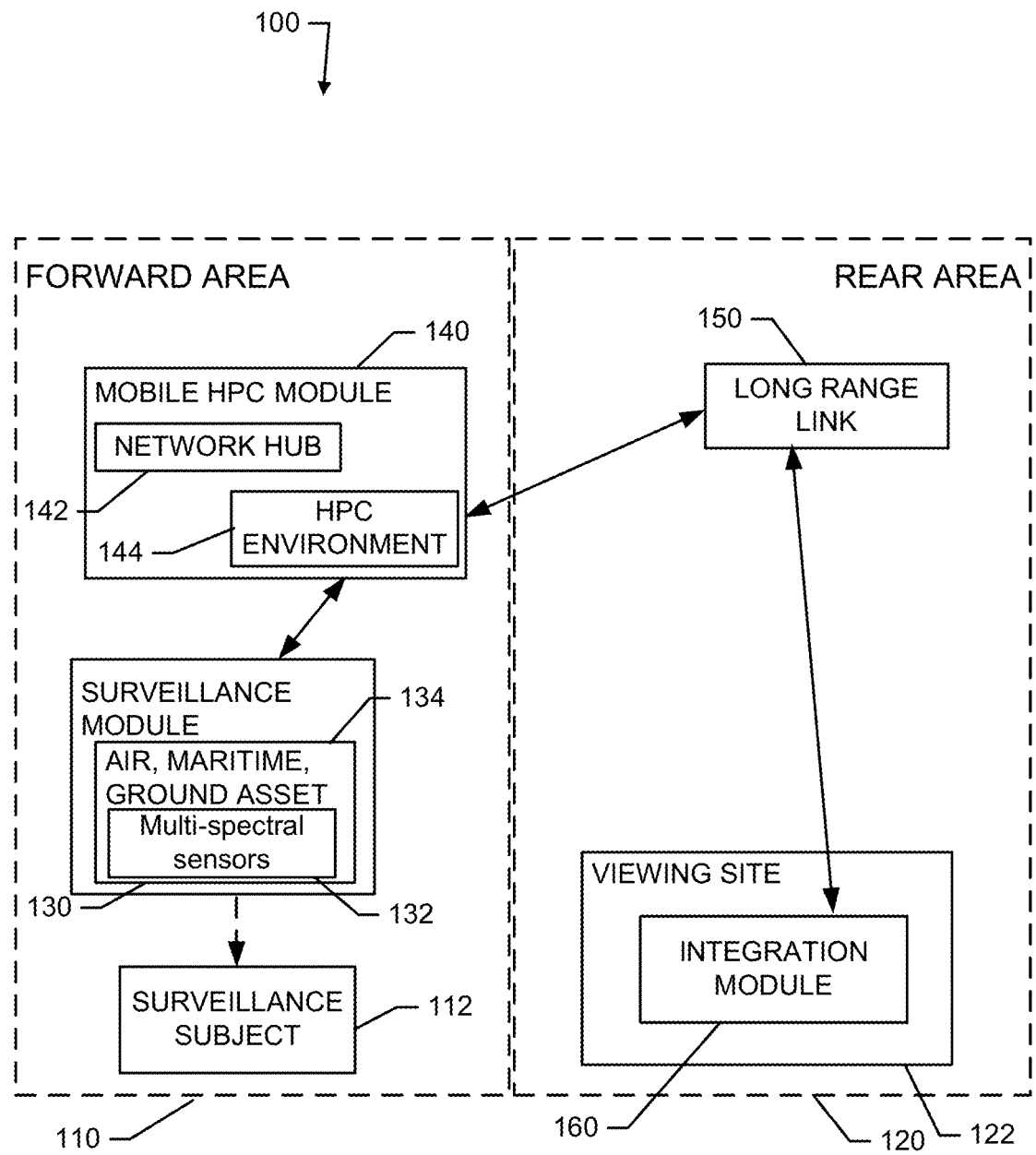
FIG. 1 illustrates a block diagram of a system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As mentioned above, example embodiments may provide an improved capability for providing LVR, MR and AR services with global reach based on deployability to any given area. To accomplish this, example embodiments may employ any number of manned aircraft and/or unmanned aerial vehicles (UAVs) producing a compressed data stream of raw, multispectral video and still imagery (imagery data can also be captured via maritime and ground-based assets as well as human-mounted imaging sensors). The transmission of this data may be carried over an end-to-end encrypted multi-spectral, multi-modal (up to 10 Gbps) airborne, maritime or ground-based communications network. The communications network hub may be co-located with a modular HPC environment on a supporting aircraft (ship or ground position) holding in a high altitude, off-set flight pattern. The aircraft may be configured to receive compressed live streaming video from UAVs or other platforms (ground or maritime), decompress the imagery and process it according to the steps outlined in section 006 and FIG. 5 to create a three-dimensional (3D) mosaic of an objective area. This mosaic may be compressed, encrypted and transmitted through various available long-range communication means to a user location. Once received at the user location, the 3D mosaic may be used to populate a virtual reality framework using a second modular HPC. This step may include machine rendering (leveraging various geospatial databases preloaded for the area of operation) to provide visual solutions for areas missed by the Multi-spectral imaging sensors, or obscured by clouds, angle, landscape, etc. In the final VR product, these solutions (e.g., solutions based on actual data versus solutions generated to fill in holes in the actual data) may be differentiated from each other in a manner that allows the user to understand the difference. For example, interpolated versus real solutions may be differentiated by color tinting or other means in order to ensure they are distinct. The user may then be capable of easily interpreting the difference between what is observed and what is machine generated in the LVR environment by the colored tinting or other means of distinction. In some cases, the user may experience the final LVR environment in a facility (e.g., a walled viewing room) featuring high-definition flat screens, virtual-reality headsets and hardware controllers for navigation purposes. The user may be enabled to mark particular areas of concern for planning using a full AR/MR menu.

Example embodiments may therefore provide military, law enforcement, and emergency response operators and planners a much clearer view of what to expect in remote, inaccessible objective areas. Example embodiments may further provide leaders with a critical tool for performing pre-mission reconnaissance, mission rehearsals, refining plans, allocating resources more accurately, protecting the force from unnecessary hazards, reducing collateral damage, reducing injuries and deaths of noncombatants, and contributing to a higher probability of mission success by confirming intelligence assessments before the initiation of combat, law enforcement, or emergency response operations.

FIG. 1 illustrates a block diagram of a system 100 in accordance with an example embodiment. The system 100 may span a forward area 110, where a surveillance subject 112 may be located, and a rear area 120, where a viewing site 122 may be located. Of note, the surveillance subject 112 may be one of many such subjects located in the forward area 110. The surveillance subject 112 may be a particular physical location or facility, a building or group of buildings, an asset (e.g., vehicle, weapon, piece of equipment, object) or group of assets, an individual or group of individuals, or any combination of the aforementioned things. Meanwhile, the viewing site 122 may be a building (or room therein), a mobile or fixed asset (e.g., a trailer, tent, or the like) or any other location capable of employing the HPC environment described herein.

The system 100 may include a surveillance module 130, a mobile HPC module 140, a long-range link module 150 and an integration module 160. The surveillance module 130 may be located in the forward area 110 and may be fully mobile. The surveillance module 130 may be operably coupled to the mobile HPC module 140 via a multi-spectral/multi-modal wireless connection. The mobile HPC module 140 may effectively pass data out of the forward area 110 and into the rear area 120. In this regard, the mobile HPC module 140 may be operably coupled to the long-range link module 150 via a wireless connection. The long-range link module 150 may then provide connectivity to the integration module 160, which can be remotely located relative to the surveillance subject 112.

In an example embodiment, the surveillance module 130 may be configured to monitor the surveillance subject 112 with one or more instances of multi-spectral imaging sensors of various resolution (e.g., visible, infrared, thermal and hyperspectral imaging sensors, etc.) 132. The surveillance module 130 may include a manned or unmanned aviation asset 134 as well as maritime, ground-based and human-mounted imaging sensors that may each further include multi-spectral and multi-modal communications equipment configured to wirelessly transmit data (in real-time) from the surveillance module to the mobile HPC module 140. It should be appreciated that, in some cases, the surveillance module 130 may include a plurality of air, maritime and/or ground assets 134 and each may be configured to directly or indirectly pass data gathered via the multi-spectral sensor suite 132 on to the mobile HPC module 140 via respective or an aggregated wireless communication link provided by their respective instances of multi-spectral and multi-modal communications equipment.

The mobile HPC module 140 may include a network hub 142 and an HPC environment 144. Via the network hub 142, the mobile HPC 140 may be operably coupled to both the surveillance module 130 (e.g., via the communications equipment of the aviation assets 134 in the surveillance module 130) and the long-range link module 150. Meanwhile, the HPC environment 144 may be configured to process the data received from the surveillance module 130 as described in greater detail below before the processed data is passed along to the long-range link module 150.

As noted above, the long-range link module 150 may enable connectivity to be established with the integration module 160, so that the data gathered by the surveillance module 130 and processed initially by the mobile HPC module 140 can be communicated to a robustly capable data processing suite, which is remotely located in the rear area 120. Accordingly, the long-range link module 150 may be configured to facilitate long range communication effectively anywhere in the world, including very distant locations, relative to the surveillance subject 112.

Figure 2:
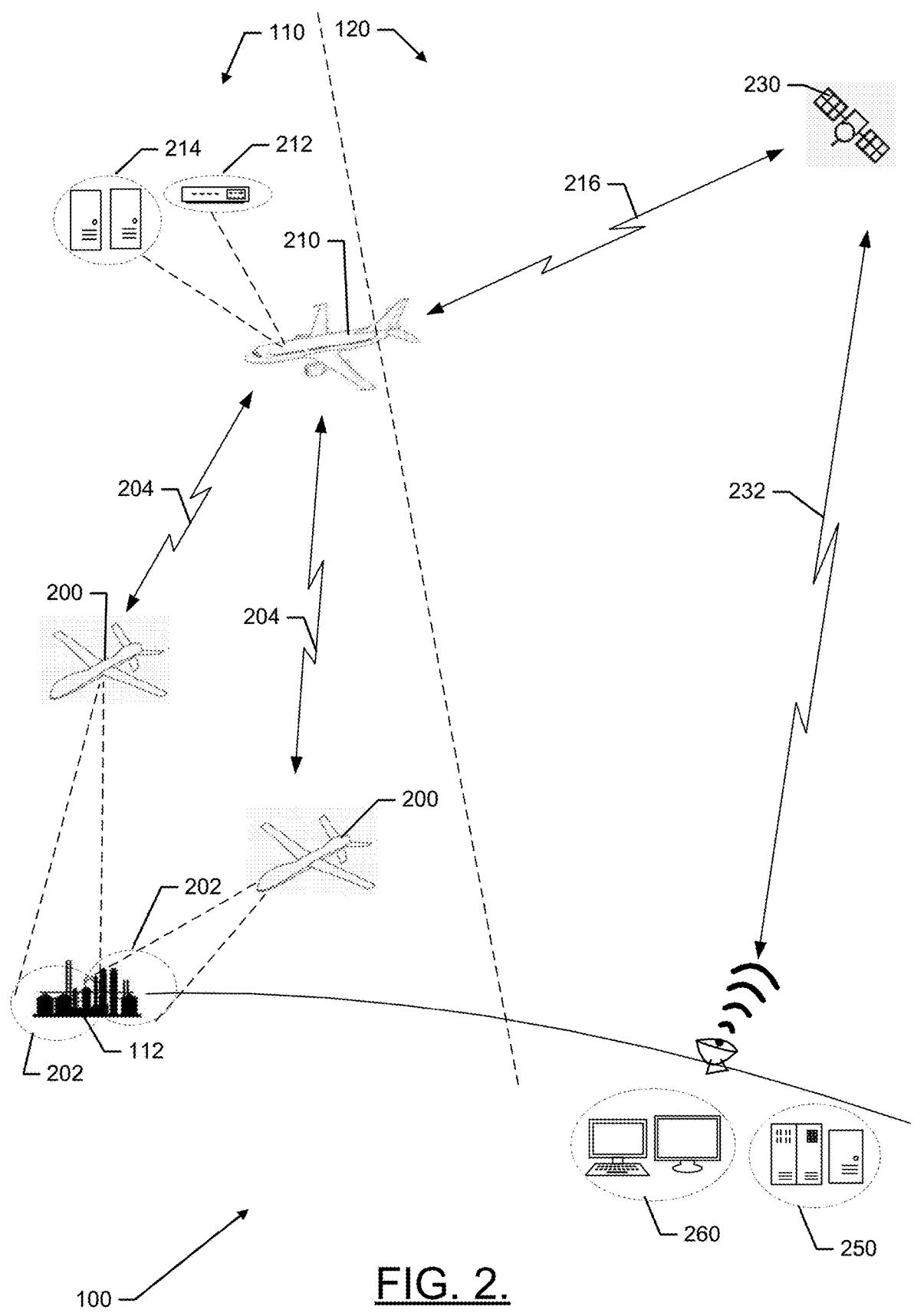
FIG. 2 illustrates a diagram of various components that may be used in the system of FIG. 1 in accordance with an example embodiment.

FIG. 2 illustrates a diagram of one specific example embodiment of the system 100, showing specific components that may embody the surveillance module 130, the mobile HPC module 140, the long-range link module 150 and the integration module 160. As shown in FIG. 2, the surveillance module 130 may include one or more instances of a UAV 200 (or other ground or maritime based sensor platforms). The multi-spectral imaging sensor payload of each of the UAVs 200 may be used to generate image data corresponding to the respective viewing perspective 202 of the UAVs 200. The system 100 is UAV airframe agnostic. Thus, any type of UAV or even other aviation assets (e.g., balloons, gliders, aircraft, etc.) as well as maritime and ground-based assets including humans could be used as mobile sensor platforms in some embodiments. Weight and space are generally the only limiting factors with respect to selection of the mobile surveillance assets 134 such as, for example, the UAVs 200.

As noted above, the multi-spectral imaging sensor payload of each of the UAVs 200 may be a high-resolution, visible-spectrum camera that is configured to fit within the payload space specified by the UAV manufacturer. The system 100 may leverage any number of existing Government-owned or other platforms. In an example embodiment, the payload of the UAV 200 (i.e., the multi-spectral imaging sensor 132) may be configured to be stabilized mechanically and/or digitally according to the features and performance of the airframe. The payload may further be configured to accommodate oblique and nadir camera angles either through fixed configuration of multiple lenses within the airframe, or by steering of the lenses to allow the viewing perspective 202 to remain on the surveillance subject 112 during movement of the UAV 200. The shutter speed of a high-resolution camera 132, as a component of a multi-spectral imaging sensor, may be configured to automatically adjust according to airspeed of the UAV 200. The high-resolution camera 132 may further be configured to include auto-focus and auto-exposure features. In an example embodiment, live video may be compressed on the UAV 200 and transmitted over wireless communications links 204. In some examples, radio links 204 may utilize Millimeter Wave (MMWave) and Sub 6 GHz frequency spectrum bands, and/or common commercial 28 GHz and 39 Ghz wireless communication frequencies depending on the requirements of a user frequency manager, who may be responsible for managing various aspects of a particular mission. Attenuation and power requirements may be adjusted according to UAV airframe specifications, and the distance/loiter demands of the UAV 200.

In the example of FIG. 2, the mobile HPC module 140 is positioned on (or embodied at) an aircraft 210. However, in various other alternative embodiments, the mobile HPC module 140 may be embodied at a maritime vessel, or a ground-based vehicle depending on availability and mission requirements. The network hub 142 on the aircraft 210 (or more generally of the HPC module 140) may be embodied as a 5G network hub 212 co-located with the HPC environment 144. The HPC environment 144 may be embodied as a modular, distributed HPC environment that includes one or more instances of computer terminals or server banks 214.

The computer terminals or server banks 214 may receive compressed live-streaming video and/or still imagery from the UAVs 200 via the wireless communication links 204 over a closed network. The computer terminals or server banks 214 may then be configured to decompress the imagery and executive the processing steps describes in section 006 and FIG. 5 to create a 3D mosaic of the area of interest (i.e., the surveillance subject 112). The 3D mosaic may then be compressed, encrypted and transmitted by the wireless network hub 212 via an encrypted communications link 216 to the long-range link 150. As shown in FIG. 2, the long-range link 150 of some embodiments may be one or more satellites 230.

Power and cooling requirements for the 5G network hub 212 and/or the computer terminals or server banks 214 may vary according to environmental conditions and positioning of the mobile HPC module 140. When the mobile HPC module 140 is located on the aircraft 210 (i.e., instead of on a ground vehicle or maritime vessel), there may be an abundance of cool air at altitude, and a corresponding reduction of power required for cooling. Thus, it may be preferred (particularly for some hot geographical locations) for the aircraft 210 to be used as the mobile HPC module 140. Additionally, an airborne 5G network may be easily repositioned to accommodate a wide range of additional ground and airborne users in instances when there is no clandestine (pre-operational) requirement. For instance, soldier, law enforcement, and emergency responder carried sensors and cameras may stream data through the 5G network once they are introduced into the objective area (i.e., the forward area 110).

In an example embodiment, a single instance of the UAV 200 may loiter around the surveillance subject 112 and generate multiple views or perspectives of the surveillance subject 112 over time. As noted above, this data may be compressed and communicated to the mobile HPC module 140. However, as shown in FIG. 2, it may also be possible to have multiple instances of the UAV 200 (or other ground or maritime based sensors) generate multiple viewing perspectives 202 that may be reconciled with each other by the computer terminals or server banks 214 of the mobile HPC module 140. Thus, it should be understood that the 3D mosaic produced by the computer terminals or server banks 214 of the mobile HPC module 140 may include data from one or more assets. For example, the 3D mosaic may include imagery data from a single or multiple UAVs 200. Moreover, in some cases, data from other sensors may be generated into respective data streams or integrated into the 3D mosaic in some cases.

In an example embodiment, the 3D mosaic produced at the computer terminals or server banks 214 of the mobile HPC module 140 may then be communicated via the encrypted wireless link 216 to the long-range link 150. The long-range link 150 may then communicate (or relay) the data stream generated by the mobile HPC module 140 including the 3D mosaic to the integration module 160 via another communication link 232, which may also be encrypted. The mode of communication is not a dependency of the system 100, but considers variables including the distance, frequency available, and signal strength. In some cases, dedicated military and law-enforcement UHF or HF channels may be employed for over-the-horizon or satellite uplink executed in association with the long-range link 150. VHF channels may be acceptable when line-of-sight communication is achievable. Other long-range communications may include microwave, optical or networked communications depending on the maturity of established theater or regional communications systems. Thus, the satellite 230 should be appreciated as merely one non-limiting example of a device capable of forming all or a portion of the long-range link 150.

Long-range data transmission between the long-range link 150 and either or both of the mobile HPC module 140 and the integration module 160 may incorporate Orthogonal Frequency-Division Multiplexing (OFDM) dividing radio channels into a large number of closely spaced subchannels (to provide more reliable communications at high speeds), and Multiple-Input Multiple-Output (MIMO) for simultaneous transmission of multiple signals (spatial multiplexing) multiplying spectral efficiency (capacity).

The integration module 160 may include an HPC stack 250, which may be similar to the computer terminals or server banks 214 of the mobile HPC module 140. The integration module 160 may also include an LVR environment 260, which may include one or more terminals, flat screen panel displays, virtual-reality headsets and/or the like for generating a final LVR product (e.g., in 360 degrees surrounding the user or users). As such, the 3D mosaic is received by the HPC stack 250 and is processed or otherwise used to populate a virtual reality framework at the LVR environment 260. The HPC stack 250 may include tools for preparing and providing the ultra-high resolution 3D mosaic for display, but may be further configured to perform machine rendering (e.g., leveraging various geospatial databases preloaded for the area of operation) to provide visual solutions for spots in the objective area (walls, doors, eaves/soffits, etc.) that may have been unobserved by the high resolution cameras 132 of the UAVs 200 due to, for example, being obscured by clouds, angle, or landscape. In this regard, in the final LVR product, these solutions are differentiated by color tinting or any of a number of other visual cues (e.g., shading, etc.). The tint or other visual cuing may help users discern what is directly observed by the 8k cameras from what is implied, yet necessary for completing the virtual environment.

Figure 3A:
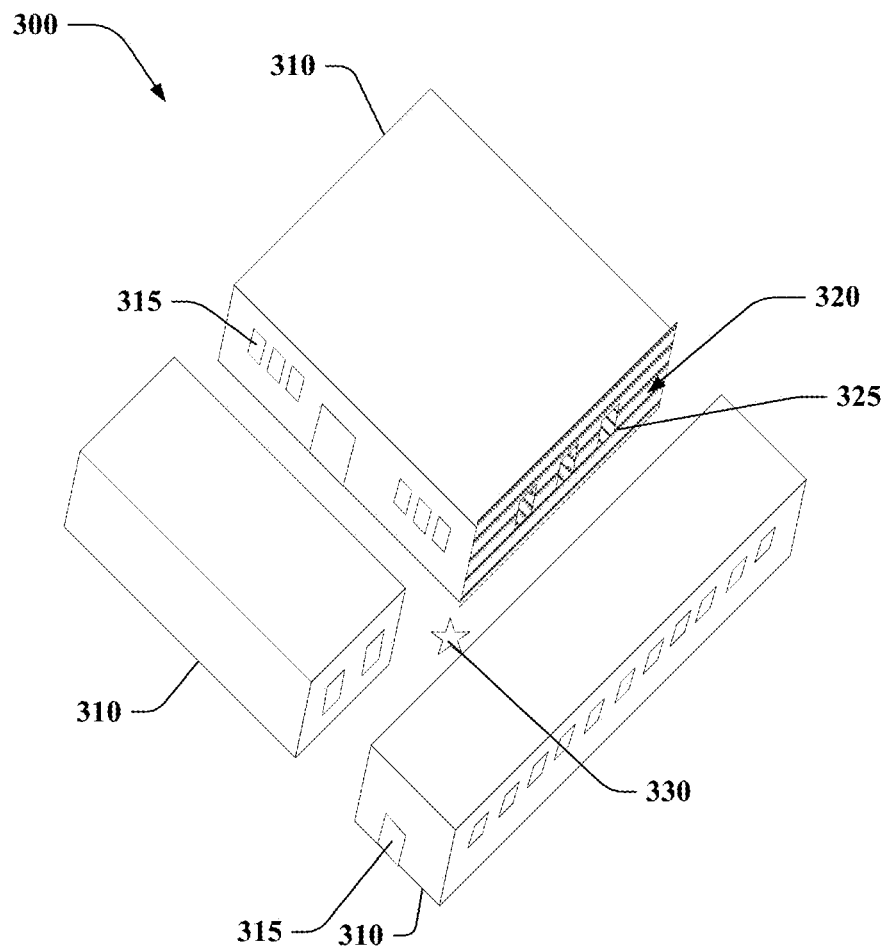
FIG. 3A illustrates a perspective view of a 3D modeled environment, which can be used to drive displays at an LVR environment for a given 3D mosaic correlating to a surveillance subject in accordance with an example embodiment.
Figure 3B:
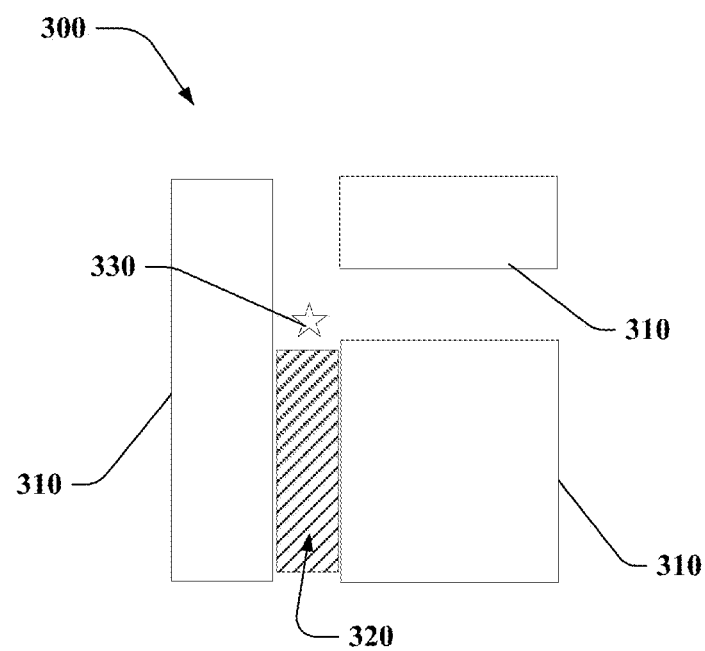
FIG. 3B illustrates a top view of the 3D modeled environment of FIG. 3A according to an example embodiment.

FIGS. 3A and 3B illustrate such an example. In this regard, FIG. 3A illustrates a perspective view of a 3D modeled environment 300, which can be used to drive the displays at the LVR environment 260 for a given 3D mosaic correlating to the surveillance subject 112 and FIG. 3B illustrates a top view of the same. The two views shown in FIGS. 3A and 3B further illustrate the fact that the user (at the LVR environment 260) may, in some cases, be able to shift the view or perspective for the view of the 3D modeled environment 300. In some cases, the views may be limited to those obtained. However, in other cases, various different standard views and perspectives may be generated from all available data, and any limitations on the ability to generate specific portions of the views may be illustrated in the 3D modeled environment 300 using various visual cues.

As shown in FIGS. 3A and 3B, the 3D modeled environment 300 may include modeled components such as buildings 310 or other objects including accurate representations of their proximity to each other. Other modeled components such as cars, aircraft, equipment, geographical features and/or natural structures may also be modeled in some cases. Structural features of various ones of the buildings 310 (e.g., doors and windows 315) may also be modeled where possible and/or appropriate. The 3D modeled environment 300 may be generated based on photogrammetric measurements and objects in images from the 3D mosaic. Thus, the 3D modeled environment 300 may be an accurate representation of all that was visible in the image data gathered by the multi-spectral imaging sensors 132.

However, the multi-spectral imaging sensors 132 may not be able to see all applicable spaces within the surveillance subject 112 in order to permit modeling of the same. Accordingly, for example, an obstructed region 320, which was not observed by the multi-spectral imaging sensors 132 of the UAVs 200, is present in the 3D modeled environment 300 of FIGS. 3A and 3B. The obstructed region 320, in this example, is illustrated by a shaded region. However, it should be appreciated that color or other visual cues could alternatively be employed, as mentioned above. In some cases, if there are intelligence reports, recognizable patterns, or other reasons to enable the 3D modeled environment 300 to be modified (e.g., by the HPC stack 250) to include estimated features 325 (or unobserved features), the estimated features 325 may also be included with annotation being made to include shading, coloring or other visual cues when rendering any output based on the 3D modeled environment 300 in order to differentiate the estimated features 325 from known or observed features. In some embodiments, the visual cues themselves may be indicative of the mechanism used to decide to include the corresponding estimated features 325. For example, some colors, shading or other visual cues could be indicative of intelligence-based estimated features 325, whereas other visual cues may be indicative of other sources (e.g., guessing, pattern recognition, original building plans, etc.).

The 3D modeled environment 300 may be used as a basis for generating an 8k LVR user experience. This means that any portion of the 3D modeled environment 300 could be viewed or toured from any of a number of movable or selectable perspectives within the 3D modeled environment 300. For example, a reference perspective 330 is marked in FIGS. 3A and 3B. It should be appreciated that the LVR environment 260 may be capable of generating a view of the 3D modeled environment 300 from the reference perspective 330 with all of the views and corresponding perspectives being generated on the 360 degree flat panels to accurately illustrate the observed features as they would appear to an observer standing at the reference perspective 330. The LVR environment 260 may also indicate which, if any, features are estimated features 325 using visual cues. The reference perspective 330 can then be moved (e.g., using a game controller or other navigation means) throughout the 3D modeled environment 300 and the corresponding views in 360 degrees may be illustrated on the flat panel displays of the LVR environment 260.

The components provided at the LVR environment 260 may include multiple 8k flat screen viewing monitors arranged along the walls of a fixed or temporary facility (including a shipping container, or other mobile facilities) to generate the 360-degree viewing/experiencing environment. The size of the facility and the arrangement of the monitors may be tailored to provide the optimum viewing experience to small groups of people, who can regularly communicate and interact with each other without the burden of wearing 3D/VR goggles. This arrangement may optimize interpersonal communication within the LVR environment 260 to facilitate unambiguous, collaborative planning between leaders, subordinates, law enforcement officials, and emergency planners. Navigation through the LVR environment 260 may be facilitated using standard gaming hardware and/or controllers in some cases. However, other proprietary navigation tools could be employed in some cases.

The system 100 may be a critical tool for performing reconnaissance, mission rehearsals, refining plans, allocating resources more accurately, protecting personnel from unnecessary hazards, reducing collateral damage and injuries, and contributing to a higher probability of mission success by confirming intelligence assessments before initiation of operations. As such, various benefits may be achieved by the system 100 including, for example, reduction of risk to forces (military, law enforcement, emergency responder, etc.), enhanced probabilities of success on targets/objectives resulting from improved pre-mission planning, reduced likelihood of injuries or deaths to military, law enforcement, and emergency responder personnel, noncombatants, or innocent civilians, reduced collateral damage, and or the like. The system 100 may therefore provide operators and planners with a much clearer view of what to expect on a target/objective. The system 100 may also enable leaders to more clearly define planning assumptions, confirm intelligence reports, and contribute to higher probabilities for mission success.

To accomplish this, example embodiments may utilize the information that can be gathered from one or multiple assets (with corresponding individual cameras or other sensors) associated with a single target/location of interest, portions of a single target/location of interest, or even multiple targets/locations of interest in order to build a model of the given area associated with the target/location of interest. In this regard, for example, each of a plurality of different assets could record and/or report (e.g., in real time) the information gathered in their individual locations (or from their individual perspectives) to provide that data (e.g., in a compressed and/or encrypted form) to a mobile HPC module 140. The information is then decompresses/decrypted or otherwise processed to be passed on (again encrypted) to a long range link 150 that can communicate the data to virtually anywhere on the globe. An LVR environment is then set up to render the information in a real time or near real time environment that may further include augmented reality aspects. Effectively, a robust understanding of the physical context/description of an area can be gained using any number of cooperating contributors that report (e.g., in real time).

Figure 4:
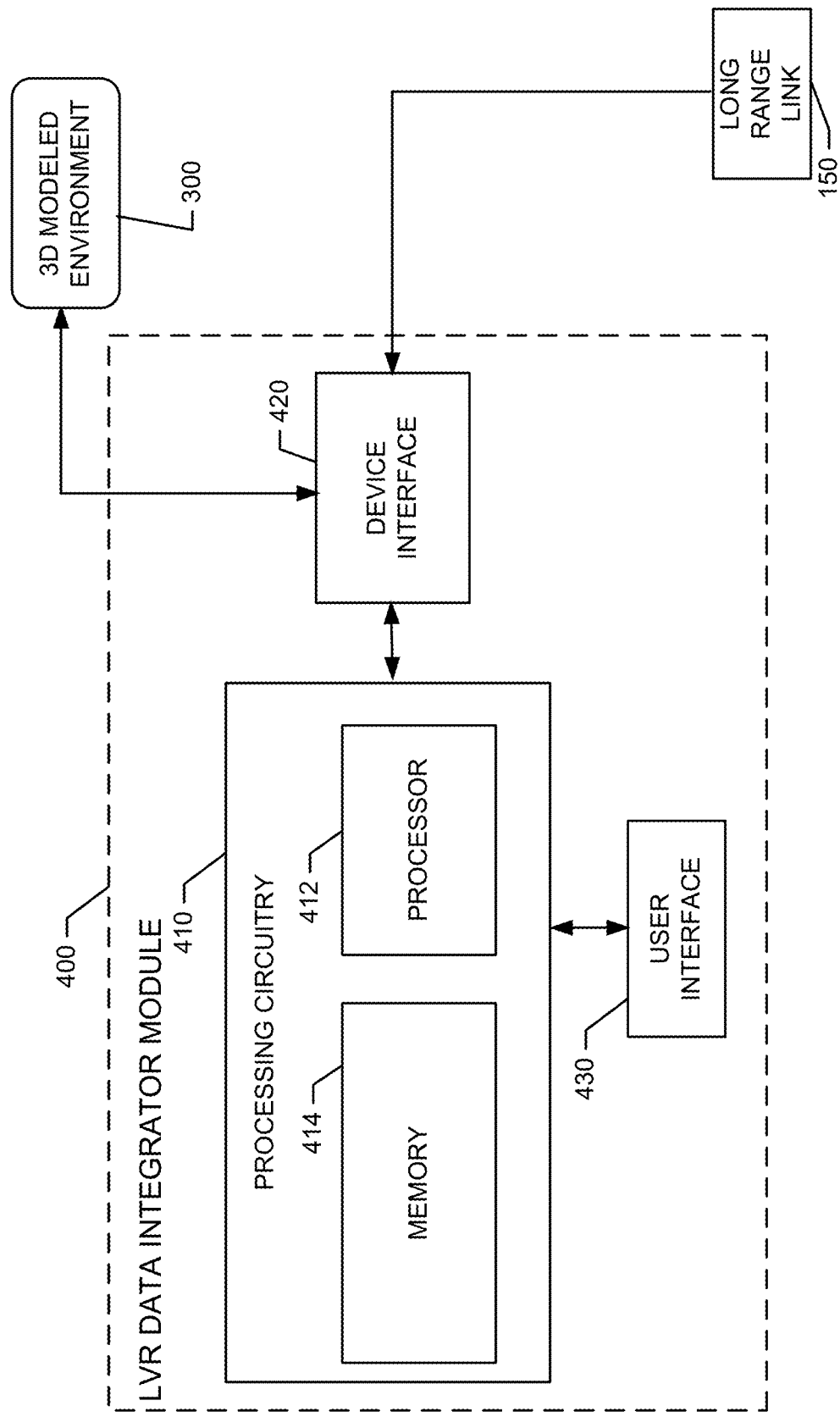
FIG. 4 illustrates a block diagram of a LVR data integrator module according to an example embodiment.

FIG. 4 illustrates a block diagram of some components that may form a LVR data integrator module 400 of an example embodiment. The LVR data integrator module 400 may be the main functional actor of the HPC stack 250 that drives the LVR environment 260. The LVR data integrator module 400 may include processing circuitry 410 configured to perform data processing, control function execution and/or other processing and management services according to an example embodiment of the present invention. In some embodiments, the processing circuitry 410 may be embodied as a chip or chip set. In other words, the processing circuitry 410 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 410 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 410 may include one or more instances of a processor 412 and memory 414 that may be in communication with or otherwise control a device interface 420 and, in some cases, a user interface 430. As such, the processing circuitry 410 may be embodied as a circuit chip (e.g., an integrated circuit chip) configured (e.g., with hardware, software or a combination of hardware and software) to perform operations described herein. In some embodiments, the processing circuitry 410 may communicate with various components, entities and/or modules of the system 100 in order to generate a model of the surveillance subject 112 that can be interacted with in the LVR environment 260.

The user interface 430 (if implemented) may be in communication with the processing circuitry 410 to receive an indication of a user input at the user interface 430 and/or to provide an audible, visual, mechanical or other output to the user. As such, the user interface 430 may include, for example, a display, mouse, speakers, keyboard, switches, indicator lights, buttons or keys (e.g., function buttons), and/or other input/output mechanisms. As noted above, the user interface 430 may include the flat panel displays of the LVR environment 260. Thus, for example, the flat panel displays of the LVR environment 260 (and therefore also of the user interface 430) may be arrayed around a user (or users) to create a 360-degree immersive experience. As noted above, a virtual tour of the 3D modeled environment 300 may be possible by shifting the reference perspective 330.

The device interface 420 may include one or more interface mechanisms for enabling communication with other devices (e.g., modules, entities, sensors and/or other components of the system 100, or the integration module 160). In some cases, the device interface 420 may be any means such as a device or circuitry embodied in either hardware, or a combination of hardware and software that is configured to receive and/or transmit data from/to modules, entities, sensors and/or other components of the system 100 or integration module 160 that are in communication with the processing circuitry 410 (directly or indirectly).

The processor 412 may be embodied in a number of different ways. For example, the processor 412 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 412 may be configured to execute instructions stored in the memory 414 or otherwise accessible to the processor 412. As such, whether configured by hardware or by a combination of hardware and software, the processor 412 may represent an entity (e.g., physically embodied in circuitry—in the form of processing circuitry 410) capable of performing operations according to embodiments of the present invention while configured accordingly. Thus, for example, when the processor 412 is embodied as an ASIC, FPGA or the like, the processor 412 may be specifically configured hardware for conducting the operations described herein. Alternatively, as another example, when the processor 412 is embodied as an executor of software instructions, the instructions may specifically configure the processor 412 to perform the operations described herein.

In an example embodiment, the processor 412 (or the processing circuitry 410) may be embodied as, include or otherwise control the operation of the LVR data integrator module 400 based on inputs received by the processing circuitry 410 responsive to receipt of high resolution video information from one or more of the UAVs or other multispectral imaging sensor platforms 200. As such, in some embodiments, the processor 412 (or the processing circuitry 410) may be said to cause each of the operations described in connection with the LVR data integrator module 400 in relation to receiving and processing high resolution video information and generating the 3D modeled environment 300 responsive to execution of instructions or algorithms configuring the processor 412 (or processing circuitry 410) accordingly.

In an exemplary embodiment, the memory 414 may include one or more non-transitory memory devices such as, for example, volatile and/or non-volatile memory that may be either fixed or removable. The memory 414 may be configured to store information, data, applications, instructions or the like for enabling the processing circuitry 410 to carry out various functions in accordance with exemplary embodiments of the present invention. For example, the memory 414 could be configured to buffer input data for processing by the processor 412. Additionally, or alternatively, the memory 414 could be configured to store instructions for execution by the processor 412. As yet another alternative, the memory 414 may include one or more databases that may store a variety of data sets responsive to receipt of video information from the UAVs or other multispectral imaging sensor platforms 200. Among the contents of the memory 414, applications and/or instructions may be stored for execution by the processor 412 in order to carry out the functionality associated with each respective application/instruction. In some cases, the applications may include instructions for providing inputs to control operation of the LVR data integrator module 400 as described herein.

In an example embodiment, the memory 414 may store the 3D modeled environment 300 or portions thereof. Alternatively, or additionally, the memory 414 may store instructions for generation of the 3D modeled environment 300 based on various rules or triggers defined in the instructions. For example, the memory 414 may store instructions that define a number of updates based on machine learning or intelligence so that the 3D modeled environment 300 can be updated for a period of time after which potentially new information that is relevant to the 3D modeled environment 300 is received. The memory 414 may further store instructions for defining how to store update information, how to aggregate or process update information, and/or how to represent such information on the 3D modeled environment 300.

The LVR data integrator module 400 may be configured to receive high resolution video information that is associated with specific times and locations and aggregate the information with respect to each separate set of information that is received so that a fully integrated model taking advantage of all available sources of information, and considering age and reliability factors, may be generated. In some cases, the LVR data integrator module 400 may employ one or more model generation algorithms to use photogrammetric information to build the models based on weighting of certain factors when some aspects of the video information appear to generate conflicts. For example, better resolution, recency of the data, or other factors may resolve conflicts and/or be used to estimate features in some cases. In some cases, model generation tools may also be used to estimate modification in future time based on past information and/or current situations and intelligence. Moreover, the frequencies used for communication of any of the information via radio links may also be modified to avoid interference or avoid jamming or damage in anticipation of a situation that will be encountered in the future, or in response to currently changing situations based on intelligence or sensors in the region or worn by operators on the ground.

Data received may be weighted with respect to integration of the data based on age of the data, the source of the data (e.g., some sources may be considered more reliable or consistent than others), or other factors. Integration of data (e.g., employing weighted averages of data received or normalizing such data) may then be conducted in accordance with strategies that are specific to the models used, and the models may be changed or selected by the viewer in some cases. The generation of visual cues to differentiate certain types of information may then be conducted to graphically display information in the 3D modeled environment 300 in a desired way.

Figure 5:
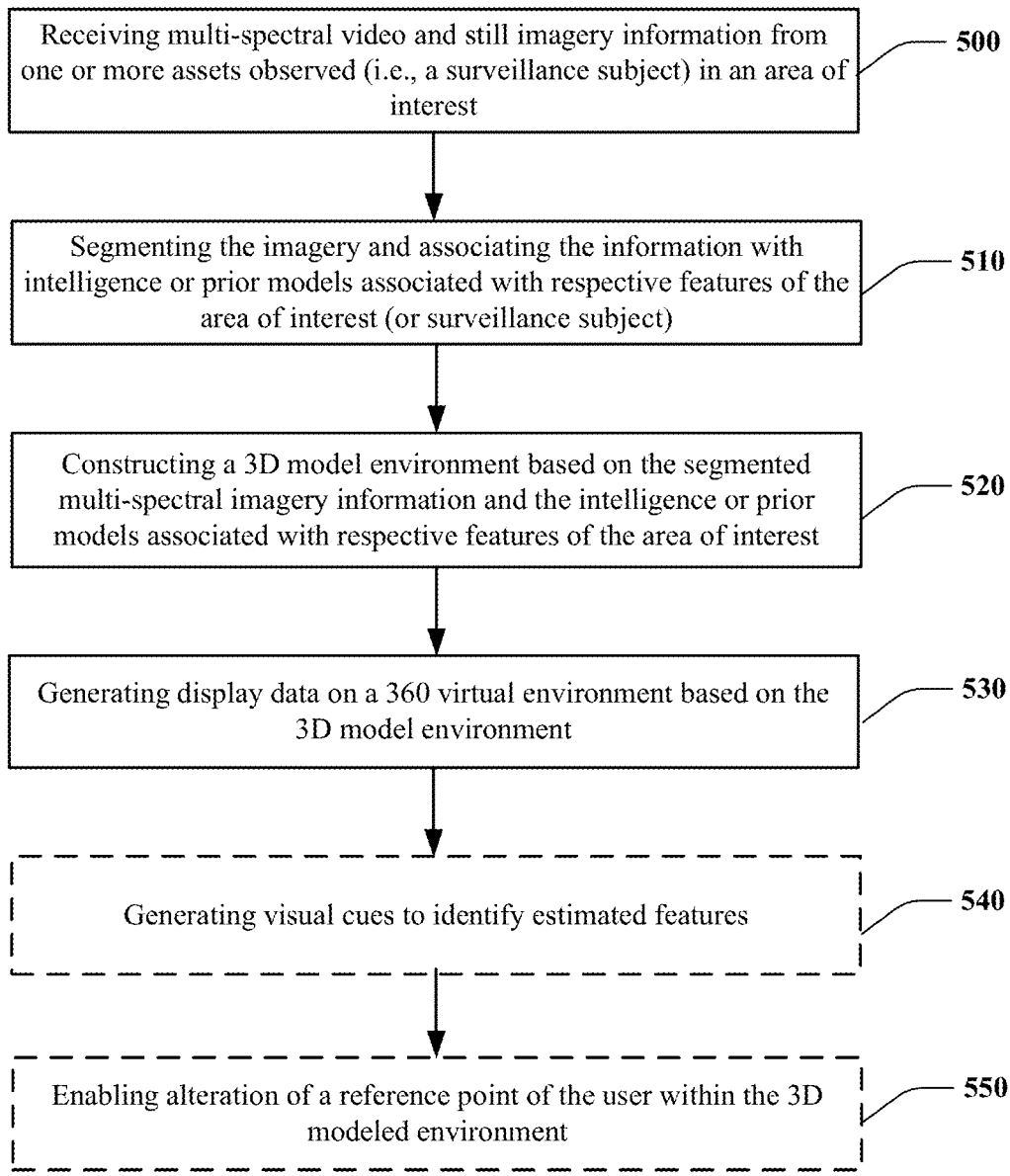
FIG. 5 illustrates a block diagram of a method of processing imagery data according to an example embodiment.

In some example embodiments, the LVR data integrator module 400 of FIG. 4 may provide a mechanism via which a number of useful methods may be practiced. FIG. 5 illustrates a block diagram of one method that may be associated with the LVR data integrator module 400 of FIG. 4. From a technical perspective, the LVR data integrator module 400 described above may be used to support some or all of the operations described in FIG. 5. As such, the platform described in FIG. 5 may be used to facilitate the implementation of several computer program and/or network communication-based interactions. As an example, FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the HPC stack 250) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include receiving multi-spectral video and still imagery information from one or more assets that have observed a surveillance subject 500 in an area of observation. The method may further include segmenting the imagery and associating the information with intelligence or prior models associated with respective features of the area at operation (surveillance subject) 510, constructing a 3D model environment based on the segmented multi-spectral imagery information and the intelligence or prior models associated with respective features of the area at operation 520, and generating display data on a 360 virtual environment based on the 3D model environment at operation 530.

In some embodiments, the method (and corresponding devices that may be configured to perform the method) may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the method may further include generating visual cues to identify estimated features at operation 540. Additionally, or alternatively, the method may further include enabling alteration of a reference point of the user within the 3D modeled environment at operation 550.

Accordingly, some example embodiments may provide a system for generating a low latency, ultra-high-resolution (e.g., 3D) representation of a surveillance subject at a remote location relative to a viewing site where the representation is presented (e.g., as a virtual-reality, mixed reality, and/or augmented reality representation of the surveillance subject). The system may include a surveillance module (e.g., forward-based) configured to obtain image data (e.g., multi-spectral video and still imagery data) of the surveillance subject, a mobile (e.g., forward-based) HPC module (which may include a closed 5G network hub) in communication with the surveillance module via a first/initial radio/communications link (e.g., multi-modal and multi-spectral) to receive the image data (and associated metadata) and process the image data. Within this context, the processing circuitry may be configured to receive a compressed live stream of multi-spectral video and still imagery data from the surveillance module, and decompress the image data and execute the processing pipeline for creating LVR, MR and AR content including selecting and improving the quality of raw imagery (e.g., correcting for shadows and reflections); segmenting imagery into feature classes such as various man-made structures (roads, buildings, doors, windows, etc.), and natural structures including terrain (dirt, rock, mud, etc.), bodies of water of various volumes and clarity, trees and other vegetation; photogrammetrically processing point clouds, digital elevation models, ortho-imagery/textures, and meshes; model feature substitution (re-using old content such as trees and shrubs versus fully developing all new content) for optimization and prioritizing post-processing model preparation; polygon decimation and mesh optimization; post-processing, tiling and simulation engine import; and assigning physics properties. Decompression and processing of the raw image data will generate the data stream as a 3D visual mosaic. The post-processing may include cleanup of the model (e.g., by an artist or operator), and may include machine learning to approximate unseen imagery into the model as well as hueing. The system may further include a long-range link in communication with the mobile HPC module via a second radio/communications link to communicate the processed image data (e.g., 3D visual mosaic) to the viewing site via a third radio/communications link, and an integration module (e.g., using a second modular HPC) disposed at the viewing site. The integration module may be configured to receive the processed image data via the third communications link, and display a virtual environment based on the processed image data. Within this context, the integration module may receive the 3D visual mosaic and use the mosaic to populate a virtual reality framework. This step may include machine rendering (leveraging various geospatial databases pre-loaded for the area of operation) to provide visual solutions for areas missed by the multi-spectral imaging sensors, or obscured by clouds, angle, landscape, etc. In the final VR product, these solutions (e.g., solutions based on actual data versus solutions generated to fill in holes in the actual data) may be differentiated from each other in a manner that allows the user to interpret the difference between what is observed and what is machine generated in the LVR environment by the colored tinting or other means of distinction. The surveillance module includes multi-spectral imaging sensors configured to obtain high and low-resolution, multi-spectral video and still-imagery. In some cases, the system may further include a user interface wherein the final LVR environment is experienced in a facility (e.g., a walled viewing room) featuring high-definition flat screens, virtual-reality headsets and hardware controllers for navigation purposes. The user may be enabled to mark particular areas of concern for planning using a full AR/MR menu. The surveillance module includes multi-spectral imaging sensors (e.g., an ultra-high resolution camera) configured to obtain high and low resolution multispectral video and still imagery data (e.g., including 8K video data comprising at least 7680×4320, 33 million pixels).

The system described above may be augmented or modified by altering individual features mentioned above or adding optional features. The augmentations or modifications may be performed in any combination and in any order.

For example, in some cases, both the surveillance module and the mobile HPC module may be deployed in a forward area in which the surveillance subject is located. The mobile HPC module may further include a closed, 5G network hub. In an example embodiment, the surveillance module may include one or more UAVs, and each of the one or more UAVs may include a respective instance of the ultra-high resolution camera or other multi-spectral imagery devices (e.g., the multi-spectral imaging sensors configured to obtain high and low-resolution, multi-spectral video and still-imagery). In some cases, the mobile HPC module may be disposed at an airborne asset, at a moving or stationary maritime asset, or at a moving or stationary ground-based asset. In an example embodiment, the mobile HPC module may be configured to receive the image data (e.g., multi-spectral imagery data from the surveillance module) as a compressed live video stream, and the HPC module may be further configured to decompress the image data and select, decimate, and photogrammetrically process images in the decompressed image data to generate a 3D visual mosaic for transmission to the integration module via the long range link. In some cases, the integration module may be configured to display the virtual environment in a 360-degree flat screen viewing facility at the viewing site. In an example embodiment, the integration module may include an HPC stack having processing circuitry configured to apply machine learning to render at least one unobserved feature in the virtual environment. The final LVR environment may be experienced in a facility (e.g., a walled viewing room) at the viewing site featuring high-definition flat screens, virtual-reality headsets and hardware controllers for navigation purposes. The user may be enabled to mark particular areas of concern for planning using a full AR/MR menu. In some cases, the processing circuitry may be further configured to display the at least one unobserved feature with a visual cue distinguishing the at least one unobserved feature from other observed features. In an example embodiment, the visual cue may include a color difference or shading difference in the rendering of at least one unobserved feature. In some cases, at least one of, or each of, the first radio/communication link, the second radio/communication link and the third radio/communication link may be an encrypted link. In some cases, the surveillance module may include one or more unmanned or manned ground-based instances comprised of multi-spectral imaging sensors configured to obtain high and low-resolution, multi-spectral video and still-imagery. In an example embodiment, the surveillance module may include one or more unmanned or manned maritime-based instances comprised of multi-spectral imaging sensors configured to obtain high and low-resolution, multi-spectral video and still-imagery.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A system for generating a low latency, high resolution representation of a surveillance subject at a remote location relative to a viewing site where the representation is presented, the system comprising:
    a surveillance module configured to obtain image data of the surveillance subject;
    a mobile high-performance computing (HPC) module in communication with the surveillance module via a first communications link to receive the image data and process the image data;
    a long-range link in communication with the mobile HPC module via a second communications link to communicate the processed image data to the viewing site via a third communications link; and
    an integration module disposed at the viewing site, the integration module being configured to receive the processed image data via the third radio link, and display a virtual environment based on the processed image data,
    wherein the surveillance module includes multi-spectral imaging sensors configured to obtain high and low resolution multispectral video and still imagery data,
    wherein both the surveillance module and the mobile HPC module are deployed in a forward area comprising the surveillance subject, and
    wherein the mobile HPC module comprises a closed, 5G network hub.

2. The system of claim 1, wherein the surveillance module comprises one or more unmanned aerial vehicles (UAVs), and
    wherein each of the one or more UAVs comprises a respective instance of the multi-spectral imaging sensors configured to obtain high and low-resolution, multi-spectral video and still-imagery.

3. The system of claim 2, wherein the mobile HPC module is disposed at an airborne asset.

4. The system of claim 2, wherein the mobile HPC module is disposed at a moving or stationary maritime asset.

5. The system of claim 2, wherein the mobile HPC module is disposed at a moving or stationary ground-based asset.

6. The system of claim 1, wherein at least one of the first communication link, the second communication link and the third communication link comprises an encrypted communication link.

7. The system of claim 1, wherein each of the first communication link, the second communication link and the third communication link comprises an encrypted communication link.

8. A system for generating a low latency, high resolution representation of a surveillance subject at a remote location relative to a viewing site where the representation is presented, the system comprising:

a surveillance module configured to obtain image data of the surveillance subject;

a mobile high-performance computing (HPC) module in communication with the surveillance module via a first communications link to receive the image data and process the image data;

a long-range link in communication with the mobile HPC module via a second communications link to communicate the processed image data to the viewing site via a third communications link; and an integration module disposed at the viewing site, the integration module being configured to receive the processed image data via the third radio link, and display a virtual environment based on the processed image data, wherein the surveillance module includes multi-spectral imaging sensors configured to obtain high and low resolution multispectral video and still imagery data, wherein the mobile HPC module is configured to receive the image data as a compressed live video stream, and wherein the HPC module is further configured to decompress the image data and select, decimate, and photogrammetrically process images in the decompressed image data to generate a three dimensional (3D) visual mosaic for transmission to the integration module via the long range link.

9. The system of claim 8, wherein the integration module is configured to display the virtual environment in a 360 degree flat screen viewing facility at the viewing site.

10. The system of claim 8, wherein the integration module comprises an HPC stack comprising processing circuitry configured to apply machine learning to render at least one unobserved feature in the virtual environment.

11. The system of claim 10, wherein the processing circuitry is further configured to display the at least one unobserved feature with a visual cue distinguishing the at least one unobserved feature from other observed features.

12. The system of claim 11, wherein the visual cue comprises a color difference or shading difference in rendering the at least one unobserved feature.

13. The system of claim 8, wherein at least one of the first communication link, the second communication link and the third communication link comprises an encrypted communication link.

14. The system of claim 8, wherein each of the first communication link, the second communication link and the third communication link comprises an encrypted communication link.

15. A mobile high performance computing (HPC) module operably coupled to one or more ground, maritime, or air assets to generating a low latency, multi-spectral image data stream for representation of a surveillance subject at a remote location relative to a viewing site at which the representation is presented, the mobile HPC module comprising:

a network hub configured to interface with the one or more ground, maritime, or air assets via a first communication link and provide the data stream through a long range communication link; and processing circuitry configured to receive a compressed live video stream from the one or more ground or air assets, and decompress the image data and select, decimate, and photogrammetrically process images in the decompressed image data to generate the data stream as a three dimensional (3D) visual mosaic for transmission to the viewing site via the long range communication link.

16. The HPC module of claim 15, wherein the one or more ground, maritime, or air assets comprised of multi-spectral imaging sensors to capture multi-spectral video and still imagery.

17. The HPC module of claim 16, wherein the mobile HPC module is disposed at an airborne asset.

18. The HPC module of claim 16, wherein the mobile HPC module is disposed at a moving or stationary maritime asset.

19. The HPC module of claim 16, wherein the mobile HPC module is disposed at a moving or stationary ground-based asset.

20. An integration module operably coupled to one or more ground or air assets via a mobile high performance computing module and a long range link to generate a low latency, ultra-high resolution data stream for representation of a surveillance subject at a remote location relative to a viewing site at which the representation is presented by the integration module, the integration module comprising processing circuitry configured to display a three dimensional (3D) visual mosaic as the representation in a virtual environment of a 360 degree flat screen viewing facility at the viewing site, wherein the integration module comprises a high performance computing (HPC) stack comprising processing circuitry configured to apply machine learning to render at least one unobserved feature in the virtual environment, wherein the processing circuitry is further configured to display the at least one unobserved feature with a visual cue distinguishing the at least one unobserved feature from other observed features, and wherein the visual cue comprises a color difference or shading difference in rendering the at least one unobserved feature.

* * * * *